United States Patent
Chen et al.

(10) Patent No.: US 9,346,934 B2
(45) Date of Patent: May 24, 2016

(54) METHOD FOR PRODUCING NANOMETER LITHOPONE FROM ELECTROLYTIC ZINC ACID LEACHING RESIDUE

(71) Applicant: SICHUAN XINHONG TECHNOLOGY CO., LTD., Chengdu, Sichuan (CN)

(72) Inventors: Shangquan Chen, Chengdu (CN); Shichun Li, Chengdu (CN); Xiaohong Li, Chengdu (CN)

(73) Assignee: SICHUAN XINHONG TECHNOLOGY CO., LTD, Chengdu (CN)

( * ) Notice: Subject to any disclaimer, the term of this patent is extended or adjusted under 35 U.S.C. 154(b) by 0 days.

(21) Appl. No.: 14/430,550

(22) PCT Filed: Sep. 25, 2012

(86) PCT No.: PCT/CN2012/081881
§ 371 (c)(1),
(2) Date: Mar. 23, 2015

(87) PCT Pub. No.: WO2014/047767
PCT Pub. Date: Apr. 3, 2014

(65) Prior Publication Data
US 2015/0218338 A1  Aug. 6, 2015

(51) Int. Cl.
*C08K 3/30* (2006.01)
*B82Y 40/00* (2011.01)
*C01G 9/08* (2006.01)
*C09C 1/06* (2006.01)

(52) U.S. Cl.
CPC . *C08K 3/30* (2013.01); *B82Y 40/00* (2013.01); *C01G 9/08* (2013.01); *C09C 1/06* (2013.01); *C01P 2004/64* (2013.01); *C08K 2003/3036* (2013.01); *C08K 2003/3045* (2013.01); *Y02P 20/582* (2015.11)

(58) Field of Classification Search
CPC .............. C08K 2003/3036; C08K 2003/3045; C08K 3/30
See application file for complete search history.

(56) References Cited

FOREIGN PATENT DOCUMENTS

CN        1065685 A      10/1992
CN      101538648 A       9/2009

OTHER PUBLICATIONS

1st Office Action of counterpart Chinese Patent Application No. 201210358132.2 issued on Sep. 27, 2013.
Zhang, Guiwen et al., Preparation of Lithopone with Zinc Scrap, Yunnan Chemical Technology, Apr. 30, 2010, pp. 84-86, vol. 37, Issue 2.
Ding Yaping et al., Emulsion Synthesis and Properties of Nano2 Lithopone, Journal of Building Materials, Mar. 31, 2003, pp. 104-106, vol. 6, Issue 1.

*Primary Examiner* — Shuangyi Abu Ali

(57) ABSTRACT

Disclosed is a method for producing nanometer lithopone from electrolytic zinc acid leaching residue. The method comprises specific steps of: leaching, purifying, carrying out a metathetical reaction, washing, smashing and the like. Through these steps, zinc is selectively leached out by an ammonia-ammonium sulfate process; and iron and arsenic are removed by ammonium persulfate, heavy metal elements such as nickel, copper, lead, cadmium and the like are removed by sulfurization method and zinc powder replacement method; and a metathetical reaction is carried out to obtain an $nZnS$—$BaSO_4$ crystalline filter cake, the crystalline filter cake is dried and smashed to obtain a nanometer lithopone product. The zinc in the acid leaching residue can be recycled effectively by this method. The ammonia leaching method is used as the technical means of effectively treating the acid leaching residue, the obtained lithopone product is good in quality, and sulfate radicals needed in the production are provided by the acid leaching residue itself, so that the resource utilization of the acid leaching residue is implemented; and in addition, the production cost is low, and the operation is simple.

8 Claims, No Drawings

US 9,346,934 B2

METHOD FOR PRODUCING NANOMETER LITHOPONE FROM ELECTROLYTIC ZINC ACID LEACHING RESIDUE

CROSS REFERENCE OF RELATED APPLICATION

This is a national phase application of an international patent application number PCT/CN2012/081881 with a filing date of Sep. 25, 2012. The contents of these specifications, including any intervening amendments thereto, are incorporated herein by reference.

BACKGROUND OF THE PRESENT INVENTION

1. Field of Invention

The present invention relates to the production technology of inorganic pigments lithopone, and more particularly to a method for producing nanometer lithopone from electrolytic zinc acid leaching residue.

2. Description of Related Arts

Inorganic pigments lithopone lithopone is also known as Xinbeibai, which is the mixed crystal of zinc sulfide and barium sulfate. Lithopone has much unique and excellent performance, and lithopone has formed a series of products, such as high ZnS type, apparent treatment type, water dispersion type, light type, color type and so on, and plays an important role in industrial and agricultural production and daily life. It is mainly used for coating, paint, thermoplastic, thermosetting plastics, paper and so on. Through the surface treatment or coating, it can replace part of rutile.

At present, lithopone is produced mainly in China. The production method of lithopone is traditional method in domestic, the main raw material is the low-grade zinc oxide, sulfate and barium sulfide (prepared by high temperature reducing using barite and coal), the zinc content of the raw materials is 45%~70%. The traditional process for production of lithopone zinc contains more than 45% zinc calcine as raw materials, leaching by Sulfuric acid, to obtain the coarse liquid of zinc sulfate, and then removing iron by oxidation method using the potassium permanganate, and then replace the heavy metals using zinc powder, filtering to obtain refined liquid of zinc sulfate, and then carrying out metathetical reaction with barium sulfide, pressure filtering, calcining, rinsing, drying, crushing, and obtain different types of lithopone product series with more than 30% of zinc sulfide. The whole process is in acid (pH<7) environment, so the whole process consumes a large amount of sulfuric acid, which has a strong corrosive. It has high requirements for production equipment, and the discharge of these present methods is acid residue, so they bring new pollution, furthermore, it requires high-grade raw materials and has high cost of production, the obtained products quality is poor.

With the development of science and technology, it has developed many kinds of pigment, inorganic pigment is facing serious challenges. Nanometer material is a kind of new material which is developed at the end of the twentieth century and it is with mesoscopic dimension scale, and it direct at low dimensional and composite. In recent years, nanometer lithopone has been put into industrial production, and it was prepared by zinc sulfate solution with the traditional method for the same, and it was synthesized in organic phase (such as benzene). These methods have high production cost, and are difficult to recycle waste water, organic solvent in the process of production and final leaching residue are easy to cause pollution to the environment, its development is severely restricted.

In addition, along with the demand of zinc compounds and lithopone is more and more big. With the continuous mining of zinc resources in our country, mineral resources become depleted, small and complex, comprehensive utilization and environmental protection requirements continue to improve, people have begun to study the utilization technology of recovery of low content zinc material. Said low content zinc material is mainly low-grade zinc oxide ore. However, in addition to low-grade zinc oxide ore contains zinc, acid leaching residue also contains zinc.

At present, in domestic zinc hydrometallurgy mainly adopts the production process of roasting, leaching and electrowinning. In the acid leaching residue which is discharged by said production process, the mass percent content of zinc is in general 8~15%, some as high as 20%, the mass percent content of sulfur is 6-12% and the mass percent content of sulfate radical is 15-30%, which mainly in the form of $CaSO_4$ (sulfate leaching rate can reach to 70% in the ammonia environment and multi-segment extraction). In the acid leaching residue, zinc exists mainly in the form of $ZnFe_2O_4$. In order to recycle this zinc, the current treatment methods are pyrometallurgy and hydrometallurgy. Said pyrometallurgy contains kiln volatilization method (namely Waelz process) and fuming furnace volatilization method. Said hydrometallurgy contains hot acid leaching and high temperature & pressure leaching. Pyrometallurgy has the disadvantages of long process, a large quantity equipment repair, high investment, and poor working environment, need to consume a large amount of coal or coal for metallurgy, low efficiency, environmental pollution. Therefore, it usually adopts hot acid leaching or high pressure leaching, these methods still have disadvantages as follow: 1. consuming a large amount of acid, low leaching rate, because it contains large amount of calcium sulfate, calcium sulfate is ultrafine particle which effect on membrane isolation for the zinc oxide particles. It result that it is difficult to leach zinc in acid environment. Twice weak acid leaching due to low recovery rate, it has little practical significance. 2. If leaching by strong acid, although $ZnFe_2O_4$ has been destroyed, the leaching rate increased, the leaching rate of iron is also high (up to 60%), it also has pressure of removing iron, and consumes more reagents, 3. the high temperature and high pressure bring serious equipment corrosion, complex equipment and the investment is large; 4. the operation cost is high, and the economic benefit is poor; 5. finally, the discharge of these present methods is acid residue, so they bring new pollution, it has no choice but to bury, not only pollute the environment, but also a waste of resources.

Therefore, the most ideal processing method for the acid leaching residue is the selective leaching of zinc, it make the zinc entering into the final leached solution, and recycle zinc to prepare valuable zinc products such as lithopone etc.

In summary, for the process of electrolytic zinc acid leaching residue, how to overcome the disadvantage of traditional pyrometallurgy and hydrometallurgy, leaching out zinc in low zinc content material effectively, and obtaining the nanometer lithopone, become the technical problem need to solves urgently.

SUMMARY OF THE PRESENT INVENTION

The object of the present invention is to overcome the disadvantage of prior art and provide a method for producing nanometer lithopone from electrolytic zinc acid leaching residue, which recycle the zinc in the acid leaching residue, In ammonia environment, it produces lithopone products which is high content of zinc sulfide and barium sulfate, and particle size is nanometer level.

In order to achieve the above object, the technical solutions of the present invention are as follows:

1) Leaching: the electrolytic zinc acid leaching residue is leached out by an ammonia-ammonium sulfate solution, the ammonia concentration is 5.5~7.0 mol/L and the ammonium sulfate concentration is 0~1 mol/L (regulating the sulfate concentration according to the type of product) in said ammonia-ammonium sulfate solution, the leaching temperature is 20~50° C., and the leaching time is 3 h~9 h, obtains final leached solution after leaching step, and said final leached solution is used for the following step;

Leaching reaction equation:

$$ZnO + n\,NH_3 \cdot H_2O \rightarrow [Zn\,NH_3)n]^{2+} + 2OH^-$$

$$Zn(OH)_2 + n\,NH_3 \rightarrow [Zn\,NH_3)n]^{2+} + 2OH^-$$

$$Zn + n\,NH_3 + 2H_2O \rightarrow [Zn\,NH_3n]^{2+} + H_2 + 2OH^-$$

(replace zinc powder which is unreacted completely in residue)

$$ZnSO_4 + n\,NH_3 \rightarrow [Zn(NH_3)n]^{2+} + SO_4^{2-}$$

$$ZnFe_2O_4 + n\,NH_3 + 4H_2O \rightarrow [Zn(NH_3)n]^{2+} + 2Fe(OH)_3\downarrow + 2OH^-$$

$$Zn_2SiO_4 + 2n\,NH_3 + 2H_2O \rightarrow 2[Zn(NH_3)n](OH)_2 + SiO_2\downarrow$$

$$CaSO_4 + 2\,NH_3 \cdot H_2O \rightarrow (NH_4)_2SO_4 + Ca(OH)_2\downarrow$$

$$CaSO_4 + 2OH^- \rightarrow SO_4^{2-} + Ca(OH)_2\downarrow$$

Thereinto, n=1~4

2) Purifying: add ammonium persulfate to said final leached solution to remove iron by oxidation method one time, and adding activated carbon to said leaching liquid to remove arsenic by adsorbing of the arsenic and iron precipitation, and then add alkali sulfide to the solution of after oxidation to remove impurity, and then separate the solution to obtain filtrate, then replacement the heavy metal elements such as nickel, copper, lead, cadmium and the like in the filtrate by using zinc powder, obtain the zinc sulfate ammonia complex refining liquid to be used for the following step;

The reaction equation:

$$S_2O_8^{2-} + Mn^{2+} + 2\,NH_3 \cdot H_2O + H_2O \rightarrow MnO(OH)_2\downarrow + 2NH_4^+ + 2SO_4^{2-} + 2H^+$$

$$S_2O_8^{2-} + 2Fe^{2+} + 6\,NH_3 \cdot H_2O \rightarrow 2\,SO_4^{2-} + 2Fe(OH)_3\downarrow + 6NH_4^+$$

$$AS_2O_3 + 3H_2O \rightarrow 2H_3AsO_3$$

$$2H_3AsO_3 + 8Fe(OH)_3 \rightarrow (Fe_2O_3)_4As_2O_3 \cdot 5H_2O\downarrow + 10H_2O$$

$$AsO_4^{3-} + Fe^{3-} \rightarrow FeAsO_4\downarrow$$

$$M^{2+} + S^{2-} \rightarrow MS\downarrow$$

M is $Cu^{2+}$, $Pb^{2+}$, $Cd^{2+}$, $Ni^{2+}$, $Hg^{2+}$, and so on $$As^{3+} + S^{2-} \rightarrow As_2S_3\downarrow$$

3) metathetical reaction: the sulfide dissolved in distilled water to get clear and transparent metathesis solution, adding non-ionic surfactant and mixing evenly, and then add to said zinc sulfate ammonia complex refining liquid for metathetical reaction, obtain lithopone emulsion, separating said emulsion by method of filtration to obtain ammonia solution and nZnS—BaSO4 crystalline filter cake, said ammonia solution return to the step of leaching after adjusting the ammonia concentration to said concentration, said nZnS—BaSO$_4$ crystalline filter cake is used for the following step;

The reaction equation:

$$[Zn(NH_3)n]SO_4 + BaS \rightarrow ZnS\downarrow + BaSO_4\downarrow + nNH_3$$

$$[Zn(NH_3)n](OH)_2 + H_2S \rightarrow ZnS\downarrow + 2H_2O + nNH_3;$$

4) Washing and smashing: wash said nZnS—BaSO$_4$ crystalline filter cake by distilled water or ethanol, then separating by method of filtration, and then drying and smashing, obtaining the nanometer lithopone product.

In said leaching step, the mass percent content of zinc is 5%~35% in said electrolytic zinc acid leaching residue. In said purifying step, after adding ammonium persulfate to said final leached solution for one time oxidation, then adding polyacrylamide flocculating agent before filtration separation, it is to remove arsenic by adsorbing of the arsenic and iron precipitation and remove harmful elements.

Preferably, in the step of said leaching, add sodium dodecyl benzene sulfonate additionally with the amount of 0.05 kg~0.1 kg per cubic meter of said ammonia-ammonium sulfate solution, because sodium dodecyl benzene sulfonate can reduce the surface energy of solution.

Preferably, in the step of said leaching, add sodium fluorosilicate additionally with the amount of 0.3 kg~0.5 kg per cubic meter of said ammonia-ammonium sulfate solution. The reason for this process is making leaching reaction more easily, more thoroughly, adding appropriate amount of sodium fluorosilicate can get rid of the wrap for particles which contains zinc, said wrap comes from ultrafine particles such as calcium hydroxide which are from the process of process of dissolution and transformation in Ammonia solution, it can achieve delamination, floating, leaching and dissolution.

Preferably, in the step of said leaching, add dicyandiamide additionally with the amount of 0.5 kg~1 kg per cubic meter of said ammonia-ammonium sulfate solution. By adding dicyandiamide, it can reduce the ammonia volatilization in the process, improve the working environment and reduce the loss of ammonia.

Preferably, in the step of said purifying, said alkali sulfide is selected from at least one of sodium sulfide, ammonium sulfide or hydrogen sulfide gas. Sulfurization can remove heavy metal elements such as $Cu^{2+}$, $Pb^{2+}$, $Cd^{2+}$, $Ni^{2+}$, $Hg^{2+}$ and the like.

Preferably, in the step of said metathetical reaction, said sulfide is selected from barium sulfide, sodium sulfide, ammonium sulfide or hydrogen sulfide gas.

Preferably, said non-ionic surfactant is 0P-10, which is the condensation of nonylphenol and epoxyethane, the adding amount of said 0P-10 is 0.15~0.2 kg per cubic meter of said metathesis solution, the temperature of metathetical reaction is 10~40° C., the stirring speed is 10~15 m/s, and the time of metathetical reaction is 0.5~1 h. Adding non-ionic surfactant is conducive to the formation of nucleation from fine crystal can effectively inhibit the growth of crystal nucleus.

More preferably, add SDS additionally to form mixed surfactant with 0P-10.

Preferably, add $H_2O_2$ to said lithopone emulsion in the step of said metathetical reaction. The mass percent of $H_2O_2$ is 10~33% t. $H_2O_2$ makes said lithopone emulsion desulfurization (mainly sulfur hydrogen ions or elemental sulfur), slowly adding $H_2O_2$ until the lithopone emulsion is colorless and transparent. Sulfate ions obtained can be recycled, which means using again for the production technology.

The reaction equation:

$$4H_2O_2 + HS^- + OH^- \rightarrow SO_4^{2-} + 5H_2O$$

$$3H_2O_2+S+2OH^-\rightarrow SO_4^{2-}+4H_2O$$

Accordingly, based on the above technical solutions, the present invention provides the following advantageous effect:

First, as an effective technology for treating acid leaching residue, the ammonia leaching method prepares nanometer lithopone in weak alkaline (PH=8.5~10) ammonia environment. In alkaline environment, the solubility of hydroxide of some metal impurities such as Ca, Mg, Fe, Al is low, in ammonia-ammonium sulfate selective leaching, the impurities which enter final leached solution were decreased, so as to ensure the quality of the products. The white degree of Lithopone prepared by traditional acid preparation is poor, and the color slants yellow, because in the process of Roasting and reduction of Zinc calcine and alkali sulfide will produce more or less elemental sulfur and sulfite, while the metathetical reaction of the present invention is processed in ammonia solution (alkaline), the final product is sulfate, through adding $H_2O_2$, the process of desulfurization is fast and hundred-percent, not only high temperature calcination can ensure the whiteness of products; the equipment requirements are lower than the sulfuric acid leaching, ordinary steel leaching tank can complete leaching. The present invention solve the problem of environmental pollution from acid leaching residue, especially it effectively solves the problem of environmental pollution from acid leaching residue which contains zinc, copper, lead, cadmium, arsenic and other heavy metals and it improves acidic soil. The present invention has the comprehensive advantages of low cost, energy saving and environmental protection.

Second, the present invention provides a large industrialized production technology which has low production cost, high efficiency, energy saving, stable quality of products and annual production capacity has reached hundreds of thousands of tons. zinc is selectively leached out by an ammonia method; and it combines with iron removal by ammonium persulfate, removal of heavy metal elements such as nickel, copper, lead, cadmium and the like by sulfurization method and zinc powder replacement method; and a metathetical reaction is carried out to obtain an nZnS—$BaSO_4$ crystalline filter cake, the crystalline filter cake is dried and smashed to directly obtain a nanometer lithopone product with no high temperature calcinations. It has good product quality and strong industrial operability.

Third, the content of zinc sulfide and barium sulfate in the product is controllable; it can regulate the types of the product according to market.

Fourth, because sulfate radical required in the present invention production is provided by said acid leaching residue itself, the mass percent of $SO_4^{2-}$ in acid leaching residue is above 15%, making use of acid leaching residue as the material of zinc and sulfate for preparing nanometer lithopone products, it not only has achieved the resource utilization for the acid leaching residue and turns waste into treasure, but also treated and improved the acidic soil causing by acid leaching residue, and purified the environment. The production cost is low and the operation is simple. The metathetical reaction is carried out in the low-density ammonia system (metathesis reactant was dissolved by recycled ammonia), the crystal nucleus formatted by the present invention is smaller, and it is non-toxic and safe. The liquid ammonia after the separation from synthesis solution returned to the leaching step, the whole production process has no waste water, waste residue from this production reached the national emission standards for the general solid waste efflux, and it is in line with national industrial policy, and it is a "green" technology for environmental protection.

DETAILED DESCRIPTION OF THE PREFERRED EMBODIMENT

The present invention is further described in details with the embodiments. The following embodiments is only used to more clearly illustrate the technical solution and not intended to be limiting.

Embodiment 1

Leaching of electrolytic zinc acid leaching residue: prepare 1500 ml ammonia-ammonium sulfate solution as ammonia leaching agent, wherein the the ammonia concentration is 5.5 mol/L and the ammonium sulfate concentration is 0.45 mol/L, and add sodium dodecyl benzene sulfonate additionally with the amount of 0.05 kg per cubic meter of said ammonia-ammonium sulfate solution, add sodium fluorosilicate additionally with the amount of 0.5 kg per cubic meter of said ammonia-ammonium sulfate solution, and add dicyandiamide additionally with the amount of 0.5 kg per cubic meter of said ammonia-ammonium sulfate solution. And then, take 500 grams of the acid leaching residue (the ingredients, according to the mass percent calculation, are 11.86% of zinc, 0.97% of copper, 28% of calcium sulfate, 0.007% of cadmium, 0.02% of arsenic and 3.74% of lead), added to said ammonia-ammonium sulfate solution to carry out three-sections leaching, leaching time is 3 hours for each section leaching, after solid-liquid separation, obtain 1450 ml of final leached solution(the rest liquid goes away by residue), leaching rate of zinc is 90.02%, the concentration of zinc in said final leached solution is 81.5 g/L, and the concentration of $SO_4^{2-}$ in said final leached solution is 80.6 g/L;

Preparation of lithopone: take 1000 ml said final leached solution to beaker with the volume of 2000 ml, heat to 98° C., then add 4 g ammonium persulfate and stir for 0.5 h with magnetic stirrer, add the polyacrylamide solution to the one-time oxidation solution, the amount of said polyacrylamide solution is 0.02‰ of said one-time oxidation solution, filter after 1 h, obtain, remove impurity in said filtrate by sulfide method and zinc powder replacement, obtain zinc sulfate ammonia complex refining liquid.

Take 142 g barium sulfide (no water) and 31.75 g sodium sulfide (no water), mix and dissolve in distilled water to obtain a metathesis solution, add 0.18 g non-ionic surfactant to said metathesis solution, said non-ionic surfactant is OP-10, which is the condensation of nonylphenol and epoxyethane, the temperature of metathetical reaction is 25° C., the speed is 13 m/s, and the time of stirring is 30 min, and then add to 1000 ml said zinc sulfate ammonia complex refining liquid, continue stirring 30 min, then adding $H_2O_2$ for desulfidation and bleaching, the mass percent of $H_2O_2$ is 10%, separate by method of filtration after bleaching, obtain nZnS—$BaSO_4$ crystalline filter cake.

Wash said nZnS—$BaSO_4$ crystalline filter cake by ethanol, filter after washing, and then dry filter cake in drying oven at 105° C. for 1 hour, then smash, track the productive rate by atomic absorption spectrometry, counting by zinc reaches 97.6%, and counting by Ba reaches 99%. Detect according to the national standard method: product mass percent counting by the total of zinc sulfide and barium sulfate reaches 99.4%, the mass percent of ZnS is 38.2%. The particle diameter of Barium sulfide is bigger than zinc sulfide, respectively 84 nm and 32 nm; indicators containing tinctorial strength, oil absorption value and other exceed the national standard which is product type of GB/T1707-1995 B311.

Embodiment 2

Leaching of electrolytic zinc acid leaching residue: prepare 1500 ml ammonia-ammonium sulfate solution as ammonia leaching agent, wherein the the ammonia concentration is 7.0 mol/L and the ammonium sulfate concentration is 0.3 mol/L, and add sodium dodecyl benzene sulfonate additionally with the amount of 0.1 kg per cubic meter of said ammonia-ammonium sulfate solution, add sodium fluorosilicate additionally with the amount of 0.3 kg per cubic meter of said ammonia-ammonium sulfate solution, and add dicyandiamide additionally with the amount of 1 kg per cubic meter of said ammonia-ammonium sulfate solution. And then, take 500 grams of the acid leaching residue (the ingredients, according to the mass percent calculation, are 8% of zinc, 1.14% of copper, 29% of calcium sulfate, 0.0086% of cadmium, 0.03% of arsenic and 1.65% of lead), added to said ammonia-ammonium sulfate solution to carry out three-sections leaching, leaching time is 2 hours for each section leaching, after solid-liquid separation, obtain 1450 ml of final leached solution(the rest liquid goes away by residue), leaching rate of zinc is 90.97%, the concentration of zinc in said final leached solution is 59.8 g/L, and the concentration of $SO_4^{2-}$ in said final leached solution is 63.62 g/L;

2. Preparation of lithopone: take 1000 ml said final leached solution to beaker with the volume of 2000 ml, heat to 98° C., then add 4 g ammonium persulfate and stir for 0.5 hour with magnetic stirrer, add the polyacrylamide solution to the one-time oxidation solution, the amount of said polyacrylamide solution is 0.02‰ of said one-time oxidation solution, filter after 1 hour, obtain, remove impurity in said filtrate by sulfide method and zinc powder replacement, obtain zinc sulfate ammonia complex refining liquid.

Take 112.3 g barium sulfide (no water) and 19.7 g sodium sulfide (no water), mix and dissolve in distilled water to obtain a metathesis solution, add 0.15 g non-ionic surfactant to said metathesis solution, said non-ionic surfactant is OP-10, which is the condensation of nonylphenol and epoxyethane, the temperature of metathetical reaction is 10° C., the stirring speed is 10 m/s, and the time of stirring is 60 min, and then add to 1000 ml said zinc sulfate ammonia complex refining liquid, continue stirring 30 min, then adding $H_2O_2$ for desulfidation and bleaching, the mass percent of $H_2O_2$ is 20%, separate by method of filtration after bleaching, obtain nZnS—$BaSO_4$ crystalline filter cake.

Wash said nZnS—$BaSO_4$ crystalline filter cake by ethanol, filter after washing, and then dry filter cake in drying oven at 105° C. for 1 hour, then smash, track the productive rate by atomic absorption spectrometry, counting by zinc reaches 98.2%, and counting by Ba reaches 99.2%. Detect according to the national standard method: product mass percent counting by the total of zinc sulfide and barium sulfate reaches 99.5%, the mass percent of ZnS is 36.56%. The particle diameter of Barium sulfide is bigger than zinc sulfide, respectively 89 nm and 41 nm; indicators containing tinctorial strength, oil absorption value and other exceed the national standard which is product type of GB/T1707-1995 B311.

Embodiment 3

Leaching of electrolytic zinc acid leaching residue: prepare 1500 ml ammonia-ammonium sulfate solution as ammonia leaching agent, wherein the the ammonia concentration is 6.0 mol/L and the ammonium sulfate concentration is 0.9 mol/L, and add sodium dodecyl benzene sulfonate additionally with the amount of 0.075 kg per cubic meter of said ammonia-ammonium sulfate solution, add sodium fluorosilicate additionally with the amount of 0.45 kg per cubic meter of said ammonia-ammonium sulfate solution, and add dicyandiamide additionally with the amount of 0.75 kg per cubic meter of said ammonia-ammonium sulfate solution. And then, take 500 grams of the acid leaching residue (the ingredients, according to the mass percent calculation, are 6.1% of zinc, 1.37% of copper, 24% of calcium sulfate, 0.0043% of cadmium, 0.025% of arsenic and 2.84% of lead), added to said ammonia-ammonium sulfate solution to carry out three-sections leaching, leaching time is 2 hours for each section leaching, after solid-liquid separation, obtain 1450 ml of final leached solution(the rest liquid goes away by residue), leaching rate of zinc is 90.02%, the concentration of zinc in said final leached solution is 65.6 g/L, and the concentration of $SO_4^{2-}$ in said final leached solution is 69.64 g/L;

2. Preparation of lithopone: take 1000 ml said final leached solution to beaker with the volume of 2000 ml, heat to 98° C., then add 4 g ammonium persulfate and stir for 0.5 hour with magnetic stirrer, add the polyacrylamide solution to the one-time oxidation solution, the amount of said polyacrylamide solution is 0.02‰ of said one-time oxidation solution, filter after 1 hour, obtain, remove impurity in said filtrate by sulfide method and zinc powder replacement, obtain zinc sulfate ammonia complex refining liquid.

Take 122.9 g barium sulfide (no water) and 21.7 g sodium sulfide (no water), mix and dissolve in distilled water to obtain a metathesis solution, add 0.2 g non-ionic surfactant to said metathesis solution, said non-ionic surfactant is OP-10, which is the condensation of nonylphenol and epoxyethane, the temperature of metathetical reaction is 40° C., the stirring speed is 15 m/s, and the time of stirring is 40 min, and then add to 1000 ml said zinc sulfate ammonia complex refining liquid, continue stirring 30 min, then adding $H_2O_2$ for desulfidation and bleaching, the mass percent of $H_2O_2$ is 30%, separate by method of filtration after bleaching, obtain nZnS—$BaSO_4$ crystalline filter cake.

Wash said nZnS—$BaSO_4$ crystalline filter cake by ethanol, filter after washing, and then dry filter cake in drying oven at 105° C. for 1 hour, then smash, track the productive rate by atomic absorption spectrometry, counting by zinc reaches 98.4%, and counting by Ba reaches 99%. Detect according to the national standard method: product mass percent counting by the total of zinc sulfide and barium sulfate reaches 99.22%, the mass percent of ZnS is 36.6%. The particle diameter of Barium sulfide is bigger than zinc sulfide, respectively 77 nm and 38 nm, indicators containing tinctorial strength, oil absorption value and other exceed the national standard which is product type of GB/T1707-1995 B311.

What is claimed is:

1. A method for producing nanometer lithopone from electrolytic zinc acid leaching residue comprising:
   1) leaching, wherein the electrolytic zinc acid leaching residue is leached out by an ammonia-ammonium sulfate solution, the ammonia concentration is 5.5~7.0 mol/L and the ammonium sulfate concentration is 0~1 mol/L in said ammonia-ammonium sulfate solution, the leaching temperature is 20~50° C., and the leaching time is 3 h~9 h; thus obtaining final leached solution;
   2) purifying, including adding ammonium persulfate to said final leached solution to remove iron by oxidation method one time, and adding activated carbon to remove arsenic by adsorbing of the arsenic and iron precipitation, adding polyacrylamide flocculating agent before filtration separation, and then adding alkali sulfide to the solution of after oxidation to remove impurity, and then separating the solution to obtain filtrate, then replacing the heavy metal elements in the filtrate by using zinc powder, obtaining the zinc sulfate ammonia complex refining liquid;
   3) processing metathetical reaction, including dissolving sulfide in distilled water to get clear and transparent metathesis solution, adding non-ionic surfactant and mixing evenly, and then adding to said zinc sulfate ammonia complex refining liquid for metathetical reaction, obtaining lithopone emulsion, separating said emulsion by method of filtration to obtain ammonia solution and nZnS—BaSO4 crystalline filter cake, wherein said sulfide is barium sulfide, wherein said ammonia solution returns to the step of leaching after adjusting the ammonia concentration to said concentration;

4) washing and smashing, including washing said nZnS—BaSO$_4$ crystalline filter cake by distilled water or ethanol, then separating by method of filtration, and then drying and smashing, and obtaining the nanometer lithopone product.

2. The method for producing nanometer lithopone from electrolytic zinc acid leaching residue according to claim 1, further comprising adding sodium dodecyl benzene sulfonate additionally with the amount of 0.05 kg~0.1 kg per cubic meter of said ammonia-ammonium sulfate solution in the step of said leaching.

3. The method for producing nanometer lithopone from electrolytic zinc acid leaching residue according to claim 1, further comprising adding sodium fluorosilicate additionally with the amount of 0.3 kg~0.5 kg per cubic meter of said ammonia-ammonium sulfate solution in the step of said leaching.

4. The method for producing nanometer lithopone from electrolytic zinc acid leaching residue according to claim 1, further comprising adding dicyandiamide additionally with the amount of 0.5 kg~1 kg per cubic meter of said ammonia-ammonium sulfate solution in the step of said leaching.

5. The method for producing nanometer lithopone from electrolytic zinc acid leaching residue according to claim 1, wherein in the step of said purifying, said alkali sulfide is selected from sodium sulfide.

6. The method for producing nanometer lithopone from electrolytic zinc acid leaching residue according to claim 1, wherein said non-ionic surfactant is OP-10, which is the condensation of nonylphenol and epoxyethane, the adding amount of said OP-10 is 0.15~0.2 kg per cubic meter of said metathesis solution, the temperature of metathetical reaction is 10~40° C., the stirring speed is 10~15 m/s, and the time of metathetical reaction is 0.5~1 h.

7. The method for producing nanometer lithopone from electrolytic zinc acid leaching residue according to claim 6, further comprising adding sodium dodecyl sulfate additionally to form mixed surfactant with OP-10.

8. The method for producing nanometer lithopone from electrolytic zinc acid leaching residue according to any one of claims 1-5 and 6, further comprising adding H$_2$O$_2$ to said lithopone emulsion in the step of said metathetical reaction.

* * * * *